US012123379B2

(12) United States Patent
Scarf et al.

(10) Patent No.: US 12,123,379 B2
(45) Date of Patent: Oct. 22, 2024

(54) DUAL CORE EXHAUST GAS RECIRCULATION COOLER

(71) Applicant: Deere & Company, Moline, IL (US)

(72) Inventors: Randy R. Scarf, Gladbrook, IA (US); Bradley R. Watkins, Cedar Falls, IA (US); Glen H. Martin, III, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/656,724

(22) Filed: Mar. 28, 2022

(65) Prior Publication Data

US 2023/0304461 A1 Sep. 28, 2023

(51) Int. Cl.

*F02M 26/24* (2016.01)
*F02M 26/04* (2016.01)
*F02M 26/26* (2016.01)
*F02M 26/38* (2016.01)
*F02M 26/53* (2016.01)

(52) U.S. Cl.

CPC ............ *F02M 26/24* (2016.02); *F02M 26/26* (2016.02); *F02M 26/38* (2016.02); *F02M 26/04* (2016.02); *F02M 26/53* (2016.02)

(58) Field of Classification Search

None

See application file for complete search history.

(56) References Cited

U.S. PATENT DOCUMENTS 4,020,809 A * 5/1977 Kern ...................... F02M 26/70 123/568.24
5,205,265 A * 4/1993 Kashiyama ............ F02M 26/03 123/568.21

(Continued)

FOREIGN PATENT DOCUMENTS

CN 114382616 A * 4/2022 ............ F02M 26/24
DE 9421145 U1 5/1995

(Continued)

OTHER PUBLICATIONS

Garrett Advancing Motion, 48V Electric Compressor for Mild Hybrid Vehicles, © 2021 Garrett Motion Inc. (9 pages).

(Continued)

*Primary Examiner* — Kevin R Steckbauer
(74) *Attorney, Agent, or Firm* — KLINTWORTH & ROZENBLAT IP LLP

(57) ABSTRACT

A dual core exhaust gas recirculation cooler includes a cooler housing having an EGR inlet, first and second EGR outlets, a cooling circuit extending from a coolant inlet through the cooler housing to a coolant outlet, a first EGR circuit core extending from the EGR inlet to the first EGR outlet, and a second EGR circuit core extending to the second EGR outlet from the EGR inlet or the first EGR outlet. A first EGR valve is configured to selectively couple the first EGR circuit core to a return passageway. A second EGR valve is configured to selectively couple the second EGR circuit core to the return passageway. The EGR valves are configured to selectively flow exhaust gas through the cooler housing within either the first EGR circuit core only or within both the first EGR circuit core and the second EGR circuit core.

8 Claims, 10 Drawing Sheets

(56) References Cited

U.S. PATENT DOCUMENTS

| | | | | | |
|---|---|---|---|---|---|
| 5,427,141 | A * | 6/1995 | Ohtsubo | F02D 9/1095 | 137/862 |
| 5,615,738 | A * | 4/1997 | Cameron | F28F 27/02 | 165/DIG. 123 |
| 5,617,726 | A * | 4/1997 | Sheridan | F02B 37/04 | 123/568.21 |
| 6,138,649 | A | 10/2000 | Khair et al. | | |
| 6,647,724 | B1 | 11/2003 | Arnold et al. | | |
| 6,904,898 | B1 * | 6/2005 | Sahlen | F02M 26/47 | 60/605.2 |
| 7,287,378 | B2 * | 10/2007 | Chen | F02M 26/24 | 123/568.2 |
| 7,621,128 | B2 * | 11/2009 | Czarnowski | F02B 37/00 | 137/625.46 |
| 7,661,415 | B2 * | 2/2010 | Nakamura | F28F 9/00 | 60/605.2 |
| 7,707,998 | B2 * | 5/2010 | Reuss | F02B 29/0418 | 701/108 |
| 7,814,748 | B2 * | 10/2010 | Nydam | F02M 26/26 | 60/292 |
| 7,845,338 | B2 * | 12/2010 | Smith | F02M 26/25 | 60/322 |
| 7,987,836 | B2 * | 8/2011 | Kurtz | F02M 26/28 | 123/568.2 |
| 8,061,138 | B2 * | 11/2011 | Pearson | F02M 26/50 | 60/605.2 |
| 8,132,407 | B2 * | 3/2012 | Li | F02M 26/25 | 60/599 |
| 8,181,452 | B2 | 5/2012 | Bidner et al. | | |
| 8,250,865 | B2 * | 8/2012 | Pearson | F02M 26/36 | 60/599 |
| 8,342,206 | B2 * | 1/2013 | Gierszewski | F02D 9/102 | 137/630.22 |
| 8,522,756 | B2 | 9/2013 | Vuk et al. | | |
| 8,528,529 | B2 * | 9/2013 | Ewen | F02M 26/32 | 123/568.12 |
| 8,695,332 | B2 * | 4/2014 | Smith | F28F 27/02 | 60/322 |
| 8,820,056 | B2 | 9/2014 | VanDyne et al. | | |
| 9,212,630 | B2 * | 12/2015 | Peters | F02D 41/0055 | |
| 9,347,365 | B2 | 5/2016 | Hunter | | |
| 9,540,989 | B2 | 1/2017 | Sanchez Perez et al. | | |
| 9,657,689 | B2 * | 5/2017 | Baasch | F02M 26/26 | |
| 9,689,295 | B1 | 6/2017 | Uhrich et al. | | |
| 9,869,258 | B2 | 1/2018 | Dion | | |
| 10,267,200 | B2 * | 4/2019 | Janssens | F28F 13/06 | |
| 10,458,369 | B2 * | 10/2019 | Quix | F02M 26/15 | |
| 10,533,525 | B2 * | 1/2020 | Seo | F02M 26/47 | |
| 10,641,191 | B2 | 5/2020 | Zeng et al. | | |
| 10,731,609 | B2 * | 8/2020 | Quix | F02M 26/23 | |
| 11,022,079 | B1 * | 6/2021 | Scarf | F02M 26/65 | |
| 11,352,986 | B2 * | 6/2022 | McConville | F02M 26/33 | |
| 2007/0089407 | A1 * | 4/2007 | Smith | F28D 7/1669 | 60/323 |
| 2008/0092861 | A1 * | 4/2008 | Duffy | F02M 26/43 | 123/568.11 |
| 2009/0025698 | A1 * | 1/2009 | Reuss | F02M 26/25 | 123/568.12 |
| 2009/0101122 | A1 * | 4/2009 | Kurtz | F02M 26/50 | 123/568.12 |
| 2009/0107142 | A1 | 4/2009 | Russell et al. | | |
| 2009/0188475 | A1 * | 7/2009 | Ueda | F02M 26/25 | 60/320 |
| 2009/0249782 | A1 * | 10/2009 | Li | F02M 26/25 | 60/599 |
| 2009/0260605 | A1 * | 10/2009 | Janssen | F02M 26/24 | 123/568.12 |
| 2009/0313992 | A1 * | 12/2009 | Pearson | F02M 26/50 | 60/599 |
| 2010/0018203 | A1 | 1/2010 | Richards | | |
| 2010/0095939 | A1 * | 4/2010 | Geskes | F02B 29/0475 | 60/320 |
| 2010/0108041 | A1 * | 5/2010 | Gruner | F02M 26/26 | 123/568.21 |
| 2010/0146968 | A1 | 6/2010 | Simpson et al. | | |
| 2011/0016862 | A1 | 1/2011 | Song et al. | | |
| 2011/0023843 | A1 * | 2/2011 | Ewen | F02M 26/25 | 123/568.12 |
| 2011/0099973 | A1 * | 5/2011 | Smith | F02M 26/26 | 60/273 |
| 2012/0056118 | A1 * | 3/2012 | Yokoyama | F02M 26/64 | 251/248 |
| 2013/0000619 | A1 * | 1/2013 | Ewen | F02M 26/32 | 123/568.12 |
| 2013/0206117 | A1 * | 8/2013 | Takeda | F02M 26/39 | 123/568.2 |
| 2014/0109571 | A1 | 4/2014 | Primus et al. | | |
| 2014/0252259 | A1 * | 9/2014 | Yokoyama | F16C 23/041 | 251/305 |
| 2014/0338875 | A1 * | 11/2014 | Barfknecht | F28F 9/0236 | 29/890.03 |
| 2015/0096284 | A1 * | 4/2015 | Gottemoller | F02M 26/22 | 251/306 |
| 2015/0176538 | A1 * | 6/2015 | Baasch | F02M 26/70 | 123/568.11 |
| 2016/0032871 | A1 * | 2/2016 | Keefover | F02M 26/64 | 123/568.11 |
| 2017/0074407 | A1 * | 3/2017 | Haesen | F01N 1/16 | |
| 2018/0163672 | A1 * | 6/2018 | Seo | F01N 5/02 | |
| 2019/0383244 | A1 | 12/2019 | Kim | | |
| 2020/0011229 | A1 | 1/2020 | Waldron et al. | | |
| 2021/0277849 | A1 | 9/2021 | Rahm et al. | | |
| 2022/0120243 | A1 * | 4/2022 | McConville | F28D 7/163 | |
| 2023/0304461 | A1 * | 9/2023 | Scarf | F02M 26/38 | |

FOREIGN PATENT DOCUMENTS

| | | | | |
|---|---|---|---|---|
| DE | 102006015390 | A1 | 10/2007 | |
| DE | 102009028925 | A1 | 3/2011 | |
| DE | 102011077148 | A1 | 12/2012 | |
| DE | 102012202857 | A1 | 8/2013 | |
| DE | 102015208418 | A1 | 11/2016 | |
| DE | 102021126876 | A1 * | 4/2022 | F02M 26/24 |
| FR | 3024178 | A1 | 1/2016 | |
| FR | 3035151 | A1 | 10/2016 | |
| FR | 3035443 | A1 | 10/2016 | |
| FR | 3035444 | A1 | 10/2016 | |
| FR | 3036738 | A1 | 12/2016 | |
| FR | 3037616 | A1 | 12/2016 | |
| FR | 3051225 | A1 | 11/2017 | |
| FR | 3053397 | A1 | 1/2018 | |
| FR | 3054602 | A1 | 2/2018 | |
| GB | 804124 | | 11/1958 | |
| GB | 2486734 | A * | 6/2012 | F01P 7/165 |
| JP | 09268916 | A1 | 10/1997 | |
| JP | 2001073880 | A1 | 3/2001 | |
| JP | 2006057570 | A | 3/2006 | |
| JP | 2006299942 | A * | 11/2006 | F02M 26/25 |
| JP | 4126730 | B2 * | 7/2008 | F02M 26/28 |
| JP | 4574425 | B2 * | 11/2010 | F02M 26/25 |
| JP | 4788531 | B2 | 10/2011 | |
| KR | 101999909 | B1 | 7/2019 | |
| RU | 2719758 | C2 | 4/2020 | |
| WO | 2020064679 | A1 | 4/2020 | |

OTHER PUBLICATIONS

Eaton, Diesel Engine EGR Pump, Precision Air Flow, https://www.eaton.com/us/en-us/products/engine-solutions/superchargers/TVS-technology-applications/tvs-diesel-egr-pump.html, © 2021 Eaton. (5 pages).

Garrett Advancing Motion, E-Turbo Technology Accelerating Global Powertrain Electrification Trends Beginning with Mercedes-AMG, Media Pressroom—Press Releases, Jul. 22, 2020, © 2021 Garrett Motion Inc. (4 pages).

University Wisconsin, Electric Turbo Chargers, Overview of Forced Induction System, WEMPEC Electrification of FIS, EFIS Topolo-

(56) References Cited

OTHER PUBLICATIONS gies, © Board of Regents of the University of Wisconsin System, Mar. 2016. (1 page).
Utility U.S. Appl. No. 17/237,876, filed Apr. 22, 2021.
Utility U.S. Appl. No. 17/306,604, filed May 3, 2021.
Utility U.S. Appl. No. 17/308,331, filed May 5, 2021.
Utility U.S. Appl. No. 17/319,256, filed May 13, 2021.
Utility U.S. Appl. No. 17/324,388, filed May 19, 2021.
Utility U.S. Appl. No. 17/358,587, filed Jun. 25, 2021, 2021.
Utility U.S. Appl. No. 17/406,656, filed Aug. 19, 2021.
USPTO Non-Final Office Action issued in Utility U.S. Appl. No. 17/237,876 on Aug. 31, 2021.
USPTO Non-Final Office Action issued in Utility U.S. Appl. No. 17/237,876 on Jan. 21, 2022.
USPTO Final Office Action issued in Utility U.S. Appl. No. 17/237,876 on Mar. 8, 2022.

* cited by examiner

DUAL CORE EXHAUST GAS RECIRCULATION COOLER

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to engine exhaust gas recirculation incorporated into work vehicles for controlling outlet gas temperature of an exhaust gas recirculation (EGR) cooler.

BACKGROUND OF THE DISCLOSURE

Heavy work vehicles, such as used in the construction, agriculture and forestry industries, may include a power system with an internal combustion engine in the form of a compression ignition engine (i.e., diesel engine) or a spark ignition engine (i.e., gasoline engine). For many heavy work vehicles, the power system includes a diesel engine that may have higher lugging, pull-down, and torque characteristics for associated work operations. Typically, a portion of the exhaust may be redirected back into the engine in an exhaust recirculation arrangement which includes a cooler, while the remaining exhaust is directed into an exhaust treatment system and out of the vehicle. Various valves are used to distribute different stages of gas into, out of, and through the engine and associated systems.

SUMMARY OF THE DISCLOSURE

The disclosure provides an exhaust gas recirculation (EGR) cooler for a power system of a work vehicle.

In one aspect, the disclosure provides a dual core exhaust gas recirculation cooler which includes a cooler housing having an EGR inlet, first and second EGR outlets, a cooling circuit extending from a coolant inlet through the cooler housing to a coolant outlet, a first EGR circuit core extending from the EGR inlet to the first EGR outlet, and a second EGR circuit core extending to the second EGR outlet from the EGR inlet or the first EGR outlet. A first EGR valve is configured to selectively couple the first EGR circuit core to a return passageway. A second EGR valve is configured to selectively couple the second EGR circuit core to the return passageway. The EGR valves are configured to selectively flow exhaust gas through the cooler housing within either the first EGR circuit core only or within both the first EGR circuit core and the second EGR circuit core.

In one aspect, the disclosure provides a dual core exhaust gas recirculation (EGR) cooler which includes a cooler housing having an EGR inlet, a first EGR outlet, a second EGR outlet, a coolant inlet and a coolant outlet; a cooling circuit extending from the coolant inlet through the cooler housing to the coolant outlet; a first EGR circuit core extending through the cooler housing from the EGR inlet to the first EGR outlet; a second EGR circuit core extending through the cooler housing to the second EGR outlet from the EGR inlet or the first EGR outlet. A first EGR valve is configured to selectively couple the first EGR circuit core to a return passageway through the first EGR outlet. A second EGR valve is configured to selectively couple the second EGR circuit core to the return passageway through the second EGR outlet. The first and second EGR valves are configured to selectively flow exhaust gas through the cooler housing from the EGR inlet to the return passageway within either the first EGR circuit core only or within both the first EGR circuit core and the second EGR circuit core.

In another aspect, the disclosure provides a dual core exhaust gas recirculation (EGR) system including a heated gas passageway and a return passageway; a cooler including a cooler housing having an EGR inlet, a first EGR outlet, a second EGR outlet, a coolant inlet and a coolant outlet, a cooling circuit extending from the coolant inlet through the cooler housing to the coolant outlet, a first EGR circuit core extending through the cooler housing from the EGR inlet to the first EGR outlet, a second EGR circuit core extending through the cooler housing to the second EGR outlet from the EGR inlet or the first EGR outlet; a first EGR valve configured to selectively couple the first EGR circuit core to the return passageway through the first EGR outlet; and a second EGR valve configured to selectively couple the second EGR circuit core to the return passageway through the second EGR outlet. The first and second EGR valves are configured to selectively flow exhaust gas through the cooler housing from the EGR inlet to the return passageway within either the first EGR circuit core only or within both the first EGR circuit core and the second EGR circuit core. The heated gas passageway is coupled to the EGR inlet. A bypass circuit having a third EGR valve is configured to selectively couple the heated gas passageway to the return passageway. The first, second and third EGR valves can be moved to one of a closed state, an open state, and a partially open state. Exhaust gas flows through the cooler housing to the return passageway within the first EGR circuit core and not the second EGR circuit core when the first EGR valve is open and the second EGR valve is closed. Exhaust gas flows through the cooler housing to the return passageway within the first EGR circuit core and the second EGR circuit core when the first EGR valve is closed and the second EGR valve is open.

In another aspect, the disclosure provides a dual core exhaust gas recirculation (EGR) system including a heated gas passageway and a return passageway; a cooler including a cooler housing having an EGR inlet, a first EGR outlet, a second EGR outlet, a coolant inlet and a coolant outlet, a cooling circuit extending from the coolant inlet through the cooler housing to the coolant outlet, a first EGR circuit core extending through the cooler housing from the EGR inlet to the first EGR outlet, and a second EGR circuit core extending through the cooler housing to the second EGR outlet from the EGR inlet or the first EGR outlet; a first EGR valve configured to selectively couple the first EGR circuit core to the return passageway through the first EGR outlet; and a second EGR valve configured to selectively couple the second EGR circuit core to the return passageway through the second EGR outlet. The first and second EGR valves are configured to selectively flow exhaust gas through the cooler housing from the EGR inlet to the return passageway within either the first EGR circuit core only or within both the first EGR circuit core and the second EGR circuit core. The heated gas passageway is coupled to the EGR inlet. A bypass circuit having a third EGR valve is configured to selectively couple the heated gas passageway to the return passageway. The first, second and third EGR valves can be moved to one of a closed state, an open state, and a partially open state. Exhaust gas flows through the cooler housing to the return passageway within the first EGR circuit core and not the second EGR circuit core when the first EGR valve is open and the second EGR valve is closed. Exhaust gas flows through the cooler housing to the return passageway within the second EGR circuit core and not the first EGR circuit core when the first EGR valve is closed and the second EGR valve is open. Exhaust gas flows through the cooler housing to the return passageway within the first EGR circuit core and the second EGR circuit core when the first EGR valve is open and the second EGR valve is open.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
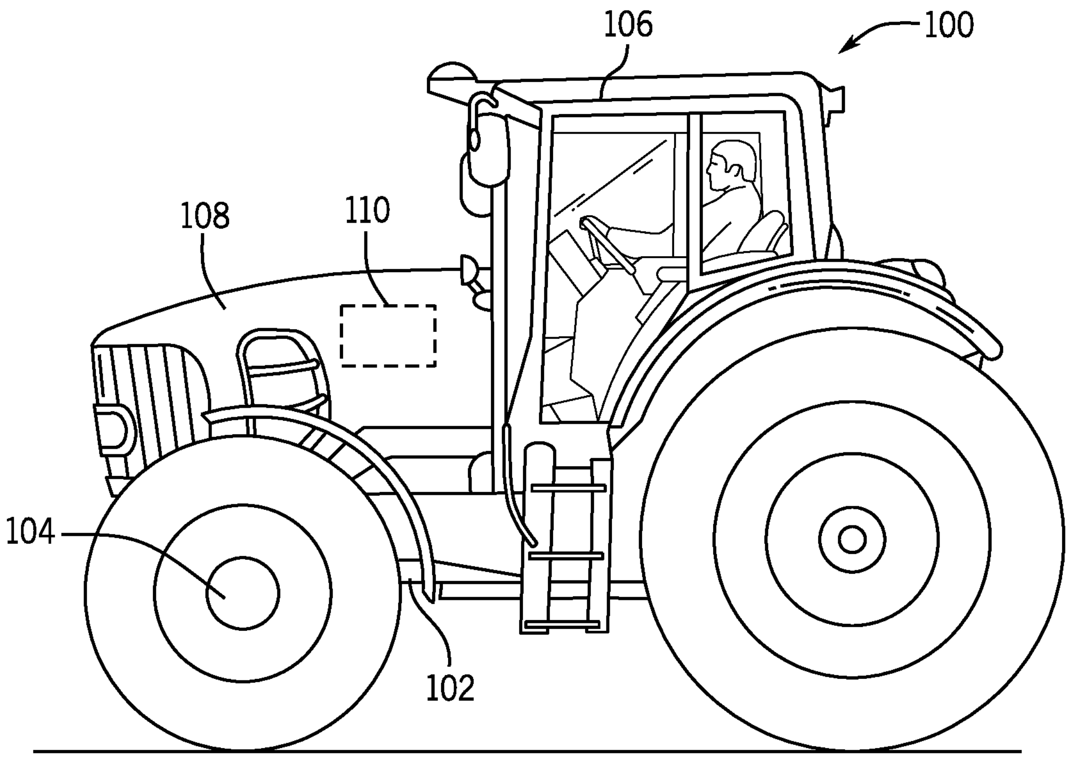
FIG. 1 is a side view of an example work vehicle in the form of a tractor in which a power system with one or more dual element engine gas valves may be used in accordance with this disclosure.

The following describes one or more example embodiments of the disclosed dual core EGR cooler, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," "circumferential," "lateral," and "transverse" may be used. Such terms are defined, at least in part, with respect to an annular passages, shafts, or components, and/or the direction of exhaust flow. As used herein, the term "longitudinal" indicates an orientation along the length of the subject element; the term "lateral" indicates an orientation along a width of the apparatus and orthogonal to the longitudinal orientation; and the term "transverse" indicates an orientation along the height of the apparatus and orthogonal to the longitudinal and lateral orientations.

As noted, work vehicles may include power systems with diesel engines to produce torque in a wide range of applications, such as long-haul trucks, tractors, agricultural or construction vehicles, surface mining equipment, non-electric locomotives, stationary power generators and the like. During the combustion process, diesel engines generate exhaust. A portion of the exhaust may be redirected back into the engine in an exhaust gas recirculation (EGR) arrangement while the remaining exhaust is directed into an exhaust treatment system and out of the vehicle. In some examples, the EGR arrangement functions to reduce nitrogen oxide (NOx) emissions by lowering the oxygen concentration in the combustion chamber, as well as through heat absorption. The exhaust treatment system functions to remove particulates, nitrogen oxides (NOx), and other types of pollutants. These systems facilitate compliance with increasingly strict emissions standards and provide operational improvements.

As described herein, the power system includes an exhaust recirculation system which controls outlet gas temperature of an exhaust gas recirculation (EGR) cooler to improve engine efficiency and operation. The exhaust recirculation system provides for passing the heated gas through a first core in a cooler housing under light loads, and further provides for passing the heated gas through the first core and a second core in the cooler housing under heavy loads. By providing a dual core exhaust gas recirculation cooler with two cores and EGR valves, under light loads, heated gas can pass through a portion of the cooler to be cooled and exit through a first outlet of the cooler housing to return to an intake manifold; under heavy loads, heated gas can pass through the entire cooler through a second outlet of the cooler housing to return to the intake manifold; or under light or heavy loads, heated gas can pass can through both outlets to modulate the temperature of the gas returning the intake manifold. This dual core exhaust gas recirculation cooler allows for management of the outlet temperature from the EGR cooler to prevent condensing the EGR gas. The dual cores are housed in the same cooler housing which reduces parts and simplifies the routing of the gas through the exhaust recirculation system, thereby providing a significant reduction in space, complexity, and cost relative to other designs. The dual core exhaust gas recirculation cooler with two EGR valves allows for having higher temperature EGR gas at low load conditions. Using two EGR valves allows for the control of outlet gas temperatures which will assists with emissions during exhaust treatment (e.g., the SCR) without damaging the engine. Also fine tuning the gas temperature may help with fuel consumption. A bypass circuit may also be provided in addition to the exhaust recirculation system.

The following describes one or more example implementations of the disclosed systems and methods for improving the power system, particularly aspects of dealing with the exhaust gas flow of power systems, as compared to conventional systems. Discussion herein may sometimes focus on the example application of power system in a tractor, but the disclosed power system is applicable to other types of work vehicles and/or other types of engine systems.

Referring to FIG. 1, in some embodiments, the disclosed dual element gas valves and associated power systems and methods may be used with a work vehicle 100. As shown, the work vehicle 100 may be considered to include a main frame or chassis 102, a drive assembly 104, an operator platform or cabin 106, and a power system 108. As is typical, the power system 108 includes an internal combustion engine used for propulsion of the work vehicle 100 via the drive assembly 104 based on commands from an operator in the cabin 106.

As described below, the power system 108 may include systems and components to facilitate various aspects of operation. For example, the power system 108 may include an engine, an intake apparatus to direct air into the engine, a turbocharger to improve efficient and/or power, an exhaust recirculation (EGR) system that redirects a portion of engine exhaust back into the engine, and an exhaust treatment system that functions to reduce pollutants prior to emission of the engine exhaust into the atmosphere.

As also described below, the power system 108 may include one or more valves and other control elements to distribute, direct, and/or control gas flow through the power system 108 that operate based on signals from a controller 110, generated automatically and/or based on commands from an operator. Such valves include one or more EGR valves and/or one or more throttle valves, as described in greater detail below.

The work vehicle 100 further includes the controller 110 (or multiple controllers) to control one or more aspects of the operation of the work vehicle 100, and in some embodiments, facilitate implementation of the power system 108, e.g., operation of the various valves and other control elements. The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

The work vehicle 100 further includes various sensors that function to collect information about the work vehicle 100. Such information may be provided to the controller 110 for evaluation and/or consideration for operating the power system 108. As examples, the sensors may include operational sensors associated with the vehicle systems and components discussed above, including engine and transmission sensors, fuel sensors, and battery sensors. In one example, the sensors may include one or more temperature or pressure sensors associated with the engine of the power system 108, as referenced in greater detail below.

As introduced above power system 108 includes an engine and associated systems that utilize various types of gas flow. Additional information regarding the power system 108, particularly the valves and other control elements that control gas flows are provided below. Although not shown or described in detail herein, the work vehicle 100 may include any number of additional or alternative systems, subsystems, and elements.

Figure 2:
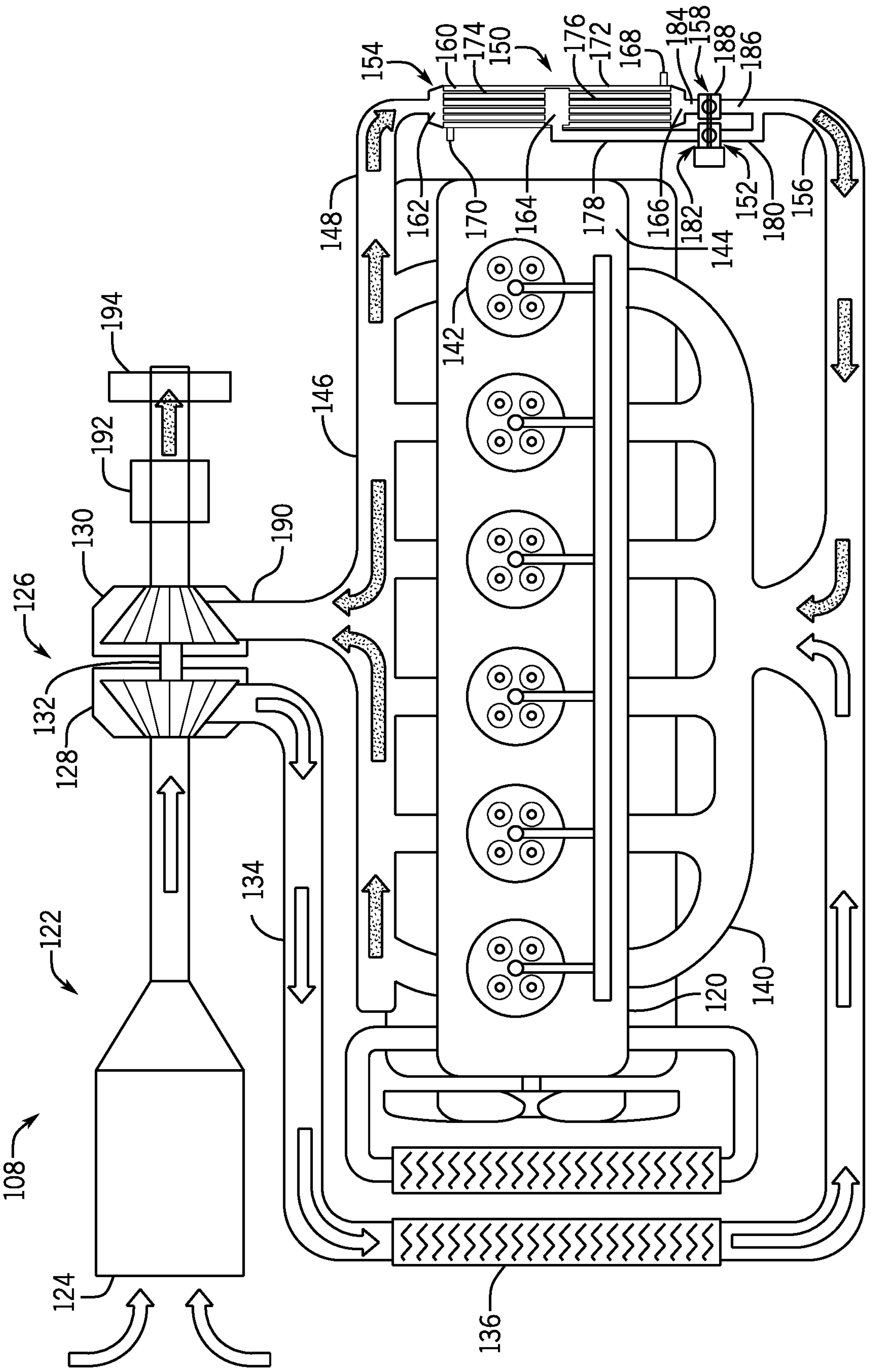
FIG. 2 is a simplified schematic diagram of a power system in accordance with a first example embodiment.

Referring to FIG. 2, there is shown a schematic illustration of the power system 108 for providing power to the work vehicle 100 of FIG. 1, although the characteristics described herein may be applicable to a variety of machines, such as on-highway trucks, construction vehicles, marine vessels, stationary generators, automobiles, agricultural vehicles, and recreation vehicles.

As introduced above, the power system 108 includes an engine 120 configured to generate power for propulsion and various other systems. Generally, engine 120 may be any kind of internal combustion engine that receives and combusts intake gas to generate energy and produce an exhaust gas, such as a gasoline engine, a diesel engine, a gaseous fuel burning engine (e.g., natural gas) or any other exhaust producing engine. As an example, the engine 120 described below is a diesel engine. The engine 120 may be of any size with any number or configuration of cylinders 142 within an engine block 144. In addition to those discussed below, the engine 120 may include any suitable feature, such as fuel systems, air systems, cooling systems, peripheries, drivetrain components, sensors, etc.

Generally, the power system 108 and/or engine 120 may be considered to include an intake apparatus 122 that directs fresh or ambient air through an inlet 124 and into the power system 108 as fresh intake gas. As shown, the intake apparatus 122 may include or otherwise interact with a turbocharger 126. In one embodiment, the turbocharger 126 includes a compressor 128 coupled to a turbine 130 via a shaft 132. With respect to the intake apparatus 122, an engine intake conduit 134 directs the fresh intake gas through the compressor 128 of the turbocharger 126 to be compressed, thereby increasing the amount of air subsequently forced into the engine 120 for improved engine efficiency and power output. The compressor 128 may be a fixed geometry compressor, a variable geometry compressor, supercharger, eCompressor, eTurbo, or any other type of compressor. Although not shown, the power system 108 may also have a second turbocharger.

The intake apparatus 122 may further include a charge cooler 136 arranged along the engine intake conduit 134 downstream of the compressor 128 to reduce the temperature of the compressed fresh intake gas. Downstream of the charge cooler 136, the engine intake conduit 134 is fluidly coupled to an intake manifold 140 that receives the fresh intake gas. As described below, the intake manifold 140 may also receive a portion of the engine exhaust as recirculated gas. In some examples, the intake manifold 140 may mix and distribute the fresh intake gas and recirculated gas, while in other examples, the fresh intake gas and recirculated gas may be mixed in an EGR mixer (not shown) prior to entering the intake manifold 140. In any event, the intake manifold 140 distributes the fresh intake gas and/or recirculated gas (generally, intake gas) into the cylinders 142 of the engine block 144. As is typical, the intake gas is mixed with fuel and ignited such that the resulting combustion products drive the mechanical output of the engine 120.

The exhaust gas produced from the combustion process is received by an exhaust manifold 146. The exhaust gas is directed through an exhaust passageway or conduit 148 into an EGR system 150 as the recirculated gas. As described in greater detail below, the flow of recirculated gas through the EGR system 150 is controlled via a first EGR valve 152 that is fluidly coupled to a dual core EGR cooler 154 and to a downstream return passageway or conduit 156 and second EGR valve 158 that is fluidly coupled to the dual core EGR cooler 154 and to the return conduit 156. The recirculated gas is directed through the exhaust conduit 148 and the dual core EGR cooler 154 to reduce the temperature of the recirculated gas prior to reentering the engine 120. The EGR system 150 is used to control the outlet gas temperature prior to reentering the engine 120. Since the EGR cooler 154 has dual cores, the temperature of the cooled gas can be controlled and modulated in the return conduit 156.

In a first embodiment as shown in FIG. 2, the dual core EGR cooler 154 includes a cooler housing 160 having an EGR inlet 162, a first EGR outlet 164, a second EGR outlet 166, a coolant inlet 168 and a coolant outlet 170. A cooling circuit 172 extends from the coolant inlet 168 through the cooler housing 160 to the coolant outlet 170. A first EGR circuit core 174 extends through the cooler housing 160 from the EGR inlet 162 to the first EGR outlet 164. A second EGR circuit core 176 extends through the cooler housing 160 from the first EGR outlet 164 to the second EGR outlet 166. The first and second EGR circuit cores 174, 176 are in series. Each EGR circuit core 174, 176 only extends along a portion of the cooler housing 160. Each EGR circuit core 174, 176 may be formed by a plurality of tubes. The tubes forming the first EGR circuit core 174 extend from the EGR inlet 162 to the first EGR outlet 164. The tubes forming the second EGR circuit core 176 extend from the first EGR outlet 164 to the second EGR outlet 166. The cooling circuit 172 forms a bath of coolant that surrounds the tubes within the cooler housing 160. Each EGR circuit core 174, 176 may have the same length or may be of different lengths.

Figure 3:
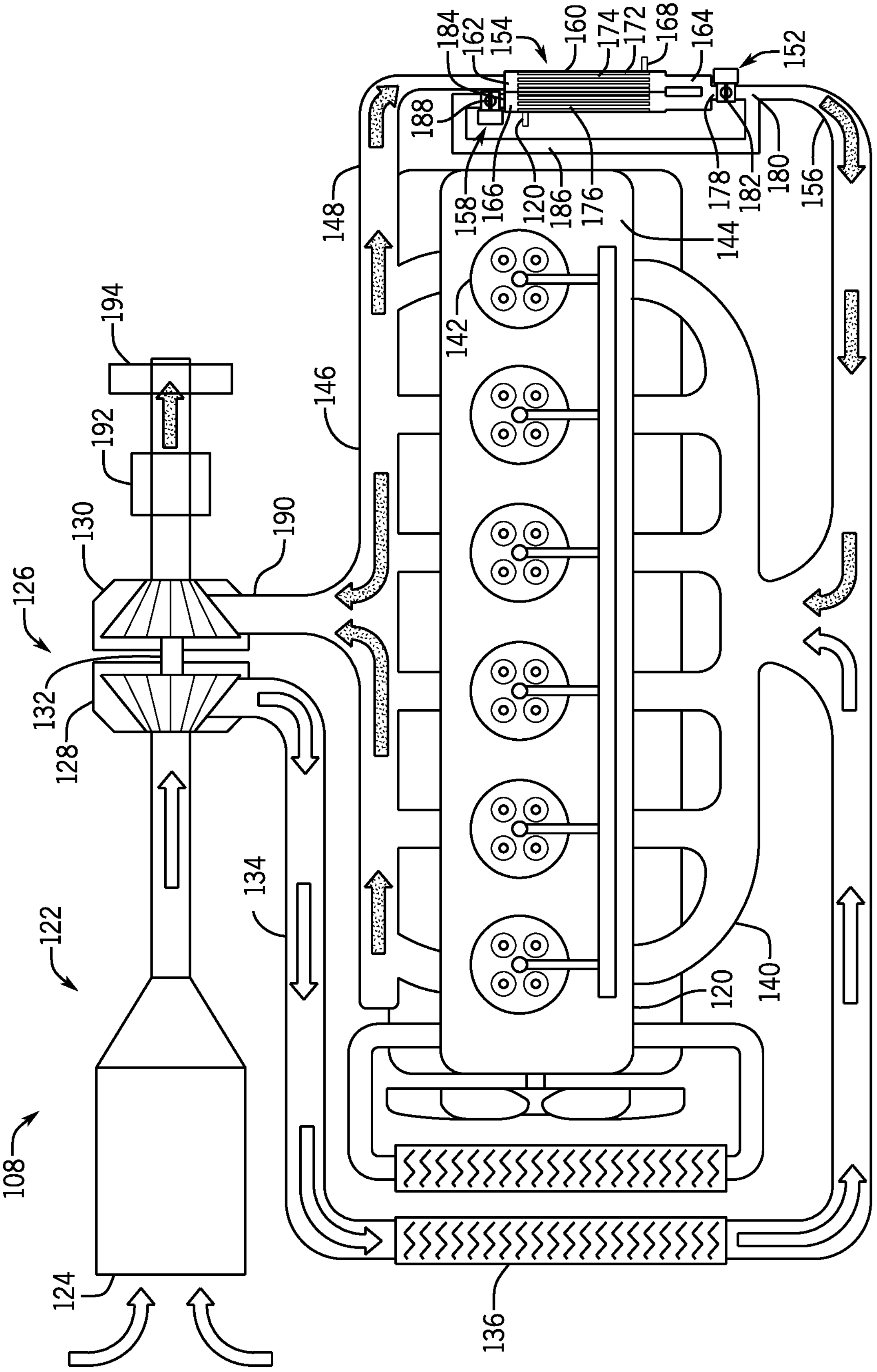
FIG. 3 is a simplified schematic diagram of a power system in accordance with a second example embodiment.

In a second embodiment as shown in FIG. 3, the dual core EGR cooler 154 includes a cooler housing 160 having an EGR inlet 162, a first EGR outlet 164, a second EGR outlet 166, a coolant inlet 168 and a coolant outlet 170. A cooling circuit 172 extends from the coolant inlet 168 through the cooler housing 160 to the coolant outlet 170. A first EGR circuit core 174 extends through the cooler housing 160 from the EGR inlet 162 to the first EGR outlet 164. A second EGR circuit core 176 extends through the cooler housing 160 from the first EGR outlet 164 to the second EGR outlet 166. The first and second EGR circuit cores 174, 176 are parallel to each other. Each EGR circuit core 174, 176 only extends along a portion of the cooler housing 160. Each EGR circuit core 174, 176 may be formed by a plurality of tubes. The tubes forming the first EGR circuit core 174 extend from the EGR inlet 162 to the first EGR outlet 164. The tubes forming the second EGR circuit core 176 extend from the first EGR outlet 164 to the second EGR outlet 166. The cooling circuit 172 forms a bath of coolant that surrounds the tubes within the cooler housing 160. Each EGR circuit core 174, 176 may have the same length or may be of different lengths.

Figure 4:
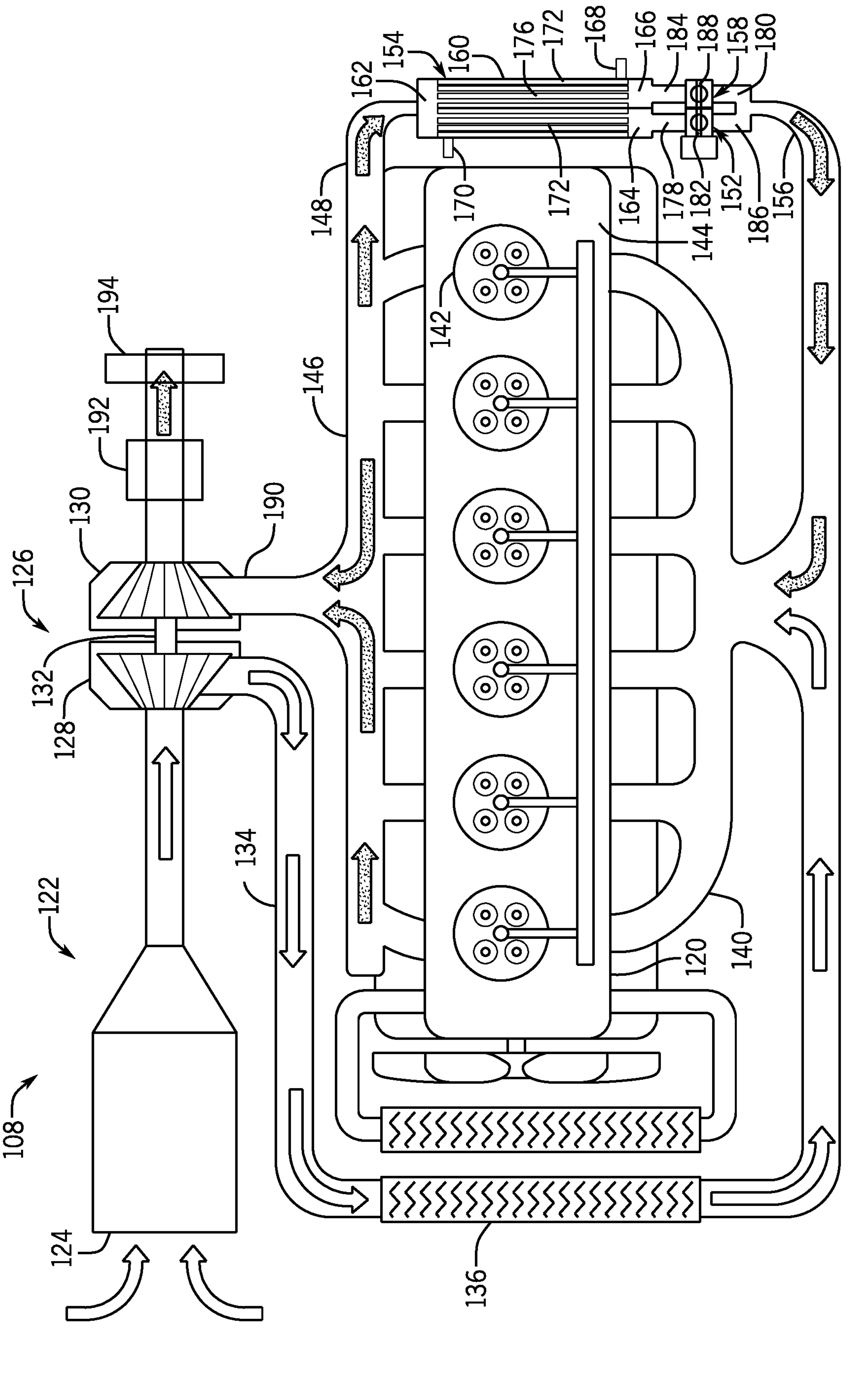
FIG. 4 is a simplified schematic diagram of a power system in accordance with a third example embodiment.

In a third embodiment as shown in FIG. 4, the dual core EGR cooler 154 includes a cooler housing 160 having an EGR inlet 162, a first EGR outlet 164, a second EGR outlet 166, a coolant inlet 168 and a coolant outlet 170. A cooling circuit 172 extends from the coolant inlet 168 through the cooler housing 160 to the coolant outlet 170. A first EGR circuit core 174 extends through the cooler housing 160 from the EGR inlet 162 to the first EGR outlet 164. A second EGR circuit core 176 extends through the cooler housing 160 from the first EGR outlet 164 to the second EGR outlet 166. The first and second EGR circuit cores 174, 176 are parallel to each other. Each EGR circuit core 174, 176 only extends along a portion of the cooler housing 160. Each EGR circuit core 174, 176 may be formed by a plurality of tubes. The tubes forming the first EGR circuit core 174 extend from the EGR inlet 162 to the first EGR outlet 164. The tubes forming the second EGR circuit core 176 extend from the EGR inlet 162 to the second EGR outlet 166. The cooling circuit 172 forms a bath of coolant that surrounds the tubes within the cooler housing 160. Each EGR circuit core 174, 176 may have the same length or may be of different lengths.

In each of the embodiments shown in FIGS. 2-4, the first EGR valve 152 selectively couples the first EGR circuit core 174 to the return conduit 156 through the first EGR outlet 164. The return conduit 156 feeds cooled gas back into the intake manifold 140 from the first EGR circuit core 174. The first EGR valve 152 may be formed of a first conduit 178 coupled to a second conduit 180 by a movable valve element 182. The first conduit 178 is in in fluid communication with the first EGR outlet 164, and the second conduit 180 is in fluid communication with the return conduit 156. The second EGR valve 158 selectively couples the second EGR circuit core 176 to the return conduit 156 through the second EGR outlet 166. The return conduit 156 feeds cooled gas back into the intake manifold 140 from the first and second EGR circuit cores 174, 176. The second EGR valve 158 may be formed of a first conduit 184 coupled to a second conduit 186 by a movable valve element 188. The first conduit 184 is in fluid communication with the second EGR outlet 166, and the second conduit 186 is in fluid communication with the return conduit 156. As such, the first and second EGR valves 152, 158 are configured to selectively flow exhaust gas through the cooler housing 160 from the EGR inlet 162 to the return conduit 156 within either the first EGR circuit core 174 only or within both the first EGR circuit core 174 and the second EGR circuit core 176.

Operation of the valve elements 182, 188 may be embodied as a method. Prior to operation, the valve elements 182, 188 are placed in a state in which valve elements 182, 188 function to close the first and second EGR valves 152, 158.

Under light loads the valve elements 182, 188 are placed in a state in which the valve element 182 of the first EGR valve 152 is open while the valve element 188 of the second EGR valve 158 is closed. This causes the heated gas to flow through EGR inlet 162, through the first EGR circuit core 174 in the heated gas is cooled, through first EGR outlet 164, through first EGR valve 152, into return conduit 156, and then into the intake manifold 140. If the temperature of the cooled gas in the return conduit 156 is too high, the valve elements 182, 188 can be placed in a state in which both valve elements 182, 188 are open in order to provide for a mixing of the air in the return conduit 156. This causes the heated gas to flow through EGR inlet 162, through the first EGR circuit core 174, through first EGR outlet 164, for a first portion to flow through first EGR valve 152 in the heated gas is cooled and thereafter into the return conduit 156, for a second portion to flow through second EGR core 176 in the heated gas is cooled, through the second EGR outlet 166, through the second EGE valve 158 and into return conduit 156 to mix with the cooled gas from the first EGR valve 152. The cooled gas from the first EGR valve 152 is warmer than the cooled gas from the second EGR valve 158. The mixed gas then flows into the intake manifold 140. Under lights loads, the valve elements 182, 188 can be controlled to open each a certain amount in order to control the amount of flow therethrough to control the temperature in the return conduit 156. Under heavy loads the valve elements 182, 188 are placed in a state in which the valve element 182 of the first EGR valve 152 is closed while the valve element 188 of the second EGR valve 158 is open. This causes the heated gas to flow through EGR inlet 162, through the first EGR circuit core 174 in which the gas is cooled, through first EGR outlet 164, through second EGR core 176 in which the gas is further cooled, through the second EGR outlet 166, through the second EGE valve 158, into return conduit 156, and then into the intake manifold 140. If the temperature of the cooled gas in the return conduit 156 is too low under the heavy load, the valve elements 182, 188 can be placed in a state in which both valve elements 182, 188 are open in order to provide for a mixing of the air in the return conduit 156. This causes the heated gas to flow through EGR inlet 162, through the first EGR circuit core 174, through first EGR outlet 164, for a first portion to flow through first EGR valve 152 and into the return conduit 156, for a second portion to flow through second EGR core 176, through the second EGR outlet 166, through the second EGE valve 158 and into return conduit 156. The mixed gas then flows into the intake manifold 140. Under heavy loads, the valve elements 182, 188 can be controlled to open each a certain amount in order to control the amount of flow therethrough to control the temperature in the return conduit 156. Alternatively, if the temperature of the cooled gas in the return conduit 156 is too low under the heavy load, the valve elements 182, 188 can be placed in a state in which the valve element 182 is open and the valve element 188 is closed.

The EGR valves 152, 158 may be operated by the controller 110 to appropriately control the recirculated gas through the EGR cooler 154. The controller 110 can fully open or close the EGR valves 152, 158 to achieve the desired temperature of the gas within the return conduit 156, and/or can partially open or close the EGR valves 152, 158 to achieve the desired temperature of the gas within the return conduit 156. Additional information regarding the EGR valves 152, 158 is provided below.

As noted above, in a downstream direction, the EGR conduits 156, 158 are fluidly coupled to the return conduit 156 that receives the cooled recirculated gas. The return conduit 156 is fluidly coupled to direct the recirculated gas into the intake manifold 140 in which, the recirculated gas is directed into the engine cylinders 142.

As noted above, only a portion of the exhaust gas from the exhaust manifold 146 is directed through the EGR system 150. The second portion of exhaust gas is directed from the exhaust manifold 146 through a second exhaust conduit 190. The turbine 130 of the turbocharger 126 may be positioned within the path of the second exhaust conduit 190 such that the second portion of the exhaust through the second exhaust conduit 190 rotates the turbine 130 to drive the compressor 128, as introduced above.

The quantity and nature of the exhaust gas through the second exhaust conduit 190 may be controlled by an exhaust gas throttle valve 192 arranged within or on the second exhaust conduit 190. In the depicted example, the exhaust gas throttle valve 192 is arranged downstream of the turbine 130. The exhaust gas throttle valve 192 may be commanded with dual valve elements by the controller 110 into various states to control the flow of exhaust gas through the conduit 190. Additional information regarding the exhaust gas throttle valve 192 is provided below.

The exhaust gas may flow through the exhaust gas throttle valve 192 to an exhaust treatment system 194. Other embodiments may not have an exhaust treatment system 194. Generally, the exhaust treatment system 194 functions to treat the exhaust gas passing therethrough. Although not described in detail, the exhaust treatment system 194 may include various components to reduce undesirable emissions. As examples, the exhaust treatment system 194 may include an inlet tube, diesel oxidation catalyst (DOC), a diesel particulate filter (DPF), a selective catalytic reduction (SCR) system, and an outlet tube. The DOC of the exhaust treatment system 194 may be configured in a variety of ways and contain catalyst materials useful in collecting, absorbing, adsorbing, reducing, and/or converting hydrocarbons, carbon monoxide, and/or nitrogen oxides (NOx) contained in the exhaust. The DPF of the exhaust treatment system 194 may be any of various particulate filters known in the art configured to reduce particulate matter concentrations, e.g., soot and ash, in the exhaust. The SCR system of the exhaust treatment system 194 functions to reduce the amount of NOx in the exhaust flow, such as by selectively injecting a reductant into the flow of exhaust that, upon mixing with the exhaust, evaporates and decomposes or hydrolyzes to produce ammonia, which reacts with NOx for reduction into less harmful emissions. After being treated by the exhaust treatment system 194, the exhaust gas is expelled into the atmosphere via a tailpipe.

Figure 5:
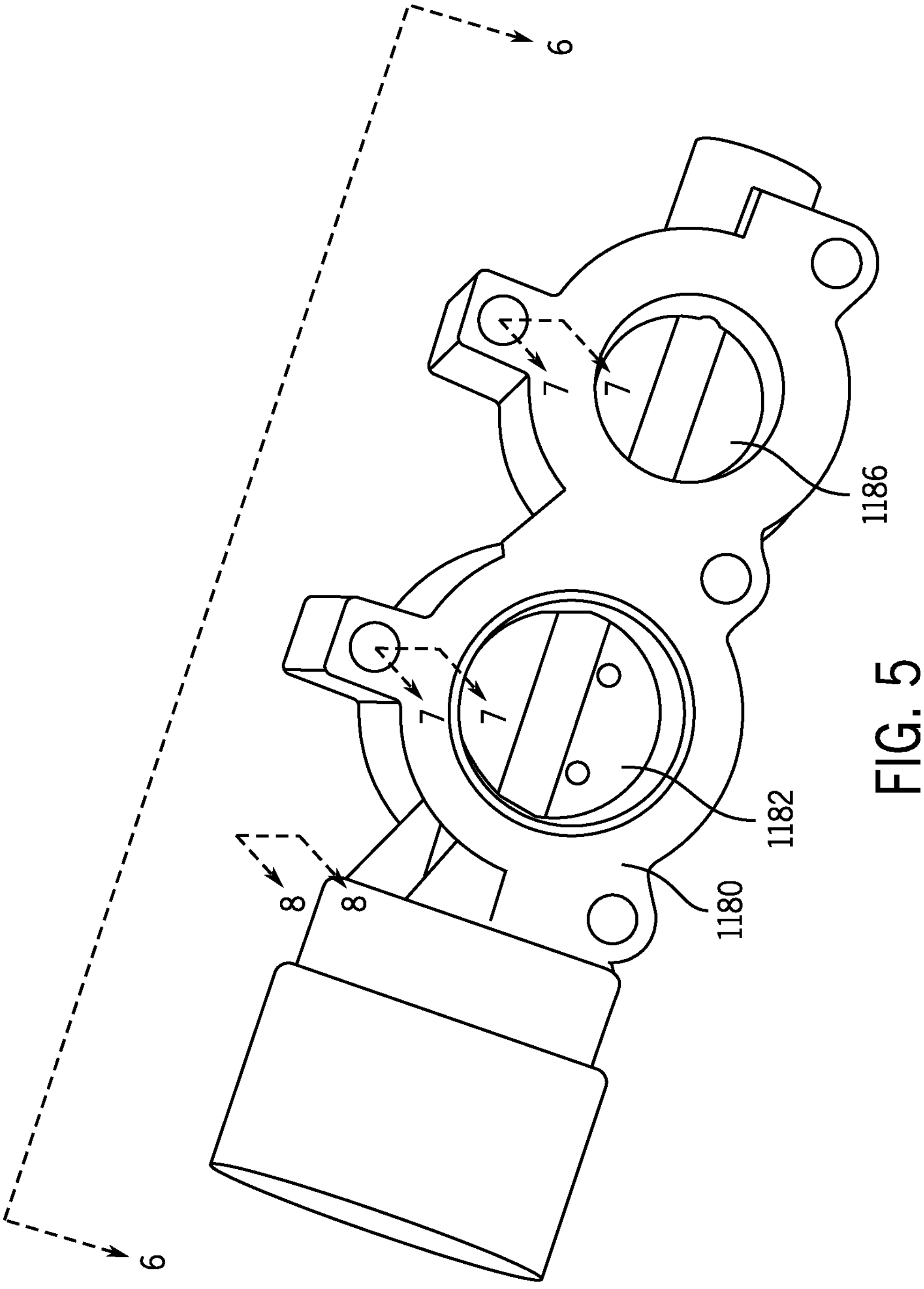
FIG. 5 is an isometric view of a dual element engine gas valve in the form of EGR valves of the power system in accordance with an example embodiment.
Figure 6:
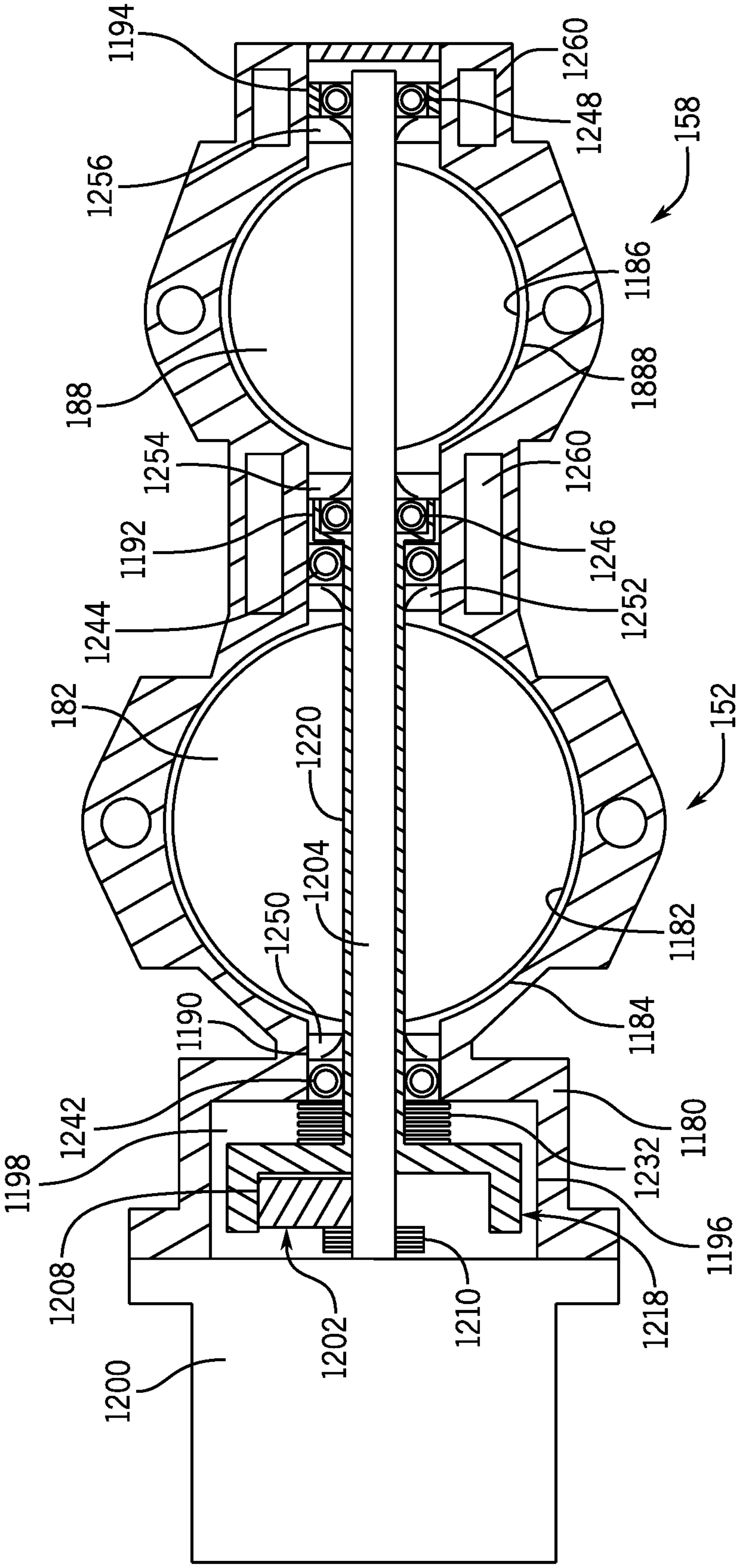
FIG. 6 is a cross-sectional view of the EGR valves through line 6-6 of FIG. 5 in accordance with an example embodiment.

As introduced above, aspects of the power system 108 are regulated by one or more valves, including the EGR valves 152, 158 and the throttle valve 192, with multiple valve elements that advantageously modulate and control the flow of gas through the engine 120 and associated systems. The view of FIG. 5 is an isometric view of the EGR valves 152, 158 removed from the power system 108, and the view of FIG. 6 is a cross-sectional view of the EGR valves 152, 158 through line 6-6 of FIG. 5.

The movable valve elements 182, 188 may be provided in a single valve housing manifold 1180 defining one or more gas flow passages. While this is shown for the embodiments of FIGS. 2 and 3 which has the valve elements 182, 188 adjacent to each other, the embodiment of FIG. 4 can be modified to provide for this by moving the valve element 188 to be adjacent to the valve element 182.

In one example, the valve housing manifold 1180 forms a first passage 1182 defined by first passage walls 1184 and a second passage 1186 defined by second passage walls 1188. In effect, the first passage 1182 is in fluid communication (and/or otherwise forms) a portion of the first EGR valve 152 to modulate the flow of recirculated gas through the first EGR valve 152, and the second passage 1186 is in fluid communication (and/or otherwise forms) a portion of the second EGR valve 158 to modulate the flow of recirculated gas through the second EGR valve 158. In addition to the passages 1182, 1186, the valve housing manifold 1180 forms a number of bearing housings 1190, 1192, 1194 and an actuation housing 1196 defining an actuation chamber 1198, each of which are described in greater detail below.

An actuator 1200 is mounted within or on the valve housing manifold 1180. The actuator 1200 is configured to engage and drive a drive device 1202, as discussed in greater detail below. The actuator 1200 is controlled (e.g., energized, deenergized, commanded) by signals from the controller 110 (FIG. 2) to place the valve elements 182, 188 in a particular state. Any suitable type of actuator 1200 may be provided, including pneumatic, hydraulic, or electronic with any suitable kind of linkage, gears, or other mechanism for transferring power to rotary motion in response to signals received from the controller (e.g., controller 110 of FIG. 1). In various examples, the actuator 1200 may be a direct drive DC motor with gear train, a brushless actuator with gear train and linkage, a DC motor with gear train and linkage, and direct drive brushless actuator with gear train, in which the gear trains may be in the form of two or three gears or a planetary gear system.

In one example, the drive device 1202 may be considered to include a drive shaft 1204 with a first end coupled to the actuator 1200 and extending from the actuation chamber 1198, through the bearing housing 1190, through the first passage 1182, through the bearing housing 1192, through the second passage 1186, and terminating at the bearing housing 1194. As shown, the drive shaft 1204 is arranged perpendicular to the flow directions through the passages 1182, 1186.

The movable valve element 182 may be a flap or butterfly-type valve element within the first passage 1182, as discussed in greater detail below. The first passage 1182 may be circular or semicircular in cross-sectional and generally cylindrical along a length, and the valve element 182 may have a complimentary shape to the first passage 1182 such that, in an initial position, the valve element 182 inhibits or prevents gas flow through the passage 1182, and may be pivoted into other positions that create a clearance between the valve element 182 and the wall of the passage wall 1184 such that gas may flow through the passage 1182.

The movable valve element 188 may be a flap or butterfly-type valve element arranged on the drive shaft 1204 within the second passage 1186 to block, inhibit, or enable flow of recirculated exhaust gas through the second passage 1186 based on the rotational position of the drive shaft 1204, as discussed in greater detail below. The second passage 1182 may be circular or semicircular in cross-sectional and generally cylindrical along a length, and the valve element 188 may have a complimentary shape to the second passage 1182 such that, in an initial position, the valve element 188 inhibits or prevents gas flow through the passage 1182, and may be pivoted into other positions that create a clearance between the valve element 188 and the passage wall 1184 such that gas may flow through the passage 1182.

The drive device 1202 further includes a drive cog (or cam) 1208 mounted on the drive shaft 1204 within the actuation chamber 1198 that enables interaction of the drive device 1202 with other actuation elements, as discussed in greater detail.

Additionally, the drive device 1202 includes a return spring 1210 arranged within the actuation chamber 1198 with a first end of the return spring 1210 coupled to the drive shaft 1204 and a second end coupled to the valve housing manifold 1180 (or another stationary element).

As described in greater detail below, the actuator 1200 may be controlled to drive the drive shaft 1204 from an initial position in at least a first direction to reposition drive cog 1208 and the valve element 188, thereby biasing the return spring 1210, and upon release of force from the actuator 1200, the return spring 1210 forces the drive shaft 1204 in the second direction, including back into the initial position.

A clutch device 1218 with a clutch body 1220 is also provided. The clutch body 1220 has a first end arranged within the actuation chamber 1198 and extends through the first bearing housing 1190, through the first passage 1182, and terminates with a second end arranged in the second bearing housing 1192. Generally, and as described in greater detail below, the clutch body 1220 is hollow with an inner peripheral surface that circumscribes at least a portion of the drive shaft 1204. The valve element 182 is mounted on the clutch body 1220 within the first passage 1182.

As also discussed in greater detail below, the clutch device 1218 includes a first clutch cog 1224 and a second clutch cog 1226 (FIGS. 8A-8D) arranged on an internal peripheral surface within the clutch body 1220 in the actuation chamber 1198 in a position to interact with the drive cog 1208 of the drive device 1202. A return spring 1232 may be arranged within the actuation chamber 1198 with a first end coupled to the clutch body 1220 and a second end coupled to the housing manifold 1180. Although not shown in FIG. 4, the clutch device 1218 further includes a clutch stop 1228 (FIGS. 8A-8D) on an outer periphery of the drive shaft 1204 that interacts with a housing stop 1230 (FIGS. 8A-8D). As described in greater detail below, the clutch body 1220 is driven by the actuator 1200 via the drive shaft 1204 from an initial position in at least a first direction to reposition the valve element 182, thereby biasing the return spring 1232; and upon release of force from the actuator 1200, the clutch return spring 1232 forces the clutch body 1220 in the second direction, including back into the initial position.

The valve elements 182, 188 includes bearings 1242, 1244, 1246, 1248 arranged within the valve housing manifold 1180 to support the drive device 1202 and the clutch device 1218. The bearings 1242, 1244, 1246, 1248 may take any suitable form, such as ball bearings or bushings. In particular, first clutch device bearings 1242 are arranged within the first bearing housing 1190, and the second clutch device bearings 1244 are arranged within the second bearing housing 1192. The first and second clutch device bearings 1242, 1244 support the clutch body 1220 on either side of the first passage 1182. Moreover, first drive device bearings 1246 are arranged within the second bearing housing 1192, and the second drive device bearings 1248 are arranged within the third bearing housing 1194. The first and second drive device bearings 1246, 1248 support the drive shaft 1204 on either side of the second passage 1186.

In order to seal the passages 1182, 1186, the valve elements 182, 188 further includes various seals 1250, 1252, 1254, 1256 that, in this example are washer-type seals circumscribing the respective shaft 1204 and body 1220. In one example, the first passage seal 1250 is arranged within the first bearing housing 1190 on the clutch body 1220, and the second passage seal 1252 is arranged within the second bearing housing 1192 on the clutch body 1220. The first and second passage seals 1250, 1252 function to seal the first passage 1182, e.g., to prevent or mitigate recirculated exhaust gas from the first passage 1182 from leaking into the actuation chamber 1198 or across the second bearing housing 1192 into the second passage 1186. Additionally, the second passage seal 1254 is arranged within the second bearing housing 1192 on the drive shaft 1204, and the second passage seal 1256 is arranged within the third bearing housing 1194 on the drive shaft 1204. The first and second passage seals 1254, 1256 function to seal the second passage 1186, e.g., to prevent or mitigate recirculated exhaust gas from the second passage 1186 from leaking into across the second bearing housing 1192 into the first passage 1182 or out of the valve elements 182, 188. In some examples, the seals 1250, 1252, 1254, 1256 may have other forms, such as labyrinth seals.

In addition to those depicted, any configuration of bearings, bearings, seals, piston rings, and other valve components may be provided. For example, alternate or additional bearings may be arranged in between the clutch device 1218 and the drive shaft 1204 within, or proximate to, the actuation chamber 1198. Further piston rings and/or bushings may be replaced by and/or supplemented by passage seals and/or bearings, and vice versa. The arrangement of such components may depend on the position of the valve elements 182, 188 relative to the EGR cooler 154 (e.g., hot side or cold side).

In some examples, one or more coolant passages 1260 may be arranged within the valve elements 182, 188, particularly within the valve housing manifold 1180 and are in fluid communication with the cooling circuit 172. In the depicted example, coolant passages 1260 are provided within the valve housing manifold 1180 proximate to the second passage 1186 to maintain the valve elements 182, 188 at an acceptable temperature.

As will now be described in greater detail, the valve elements 182, 188 operate between states to modulate the flows of recirculated exhaust gas through the first passage 1182 and through the second passage 1186 with the single actuator 1200. In particular, the actuator 1200 drives the drive device 1202 to reposition the valve element 188, and the movement of the drive device 1202 operates to drive the clutch device 1218 to reposition the valve element 182.

Operation of the valve elements 182, 188 is depicted by the views of FIGS. 7A-7D and FIGS. 8A-8D in the various states. The views of FIGS. 7A-7D are cross-sectional views of the second passage 1186 (dashed lines) overlaid onto the first passage 1182 (solid lines) to depict various relative positions of the valve element 188 (dashed lines) and the valve element 182 (solid lines). In effect, the views of FIGS. 7A-7D correspond to the cross-sectional view through line 7-7 in FIG. 5 overlaid onto the cross-sectional view through line 7'-7' in FIG. 5. The views of FIGS. 8A-8D are cross-sectional views through line 8-8 in FIG. 5 to depict aspects of the drive device 1202 and the clutch device 1218 that correspond to the respective positions of the valve elements 182, 188 of FIGS. 7A-7D. The views of FIGS. 8A-8D particularly depict the drive shaft 1204 and drive cog 1208 arranged within the clutch body 1220 relative to the first and second clutch cogs 1224, 1226, as well as the clutch stop 1228 relative to the housing stop 1230.

The valve elements 182, 188 may be commanded into one or more states to control the gas flows through the first passage 1182 (and thus, through the first EGR valve 152) and the second passage 1186 (and thus, the second EGR valve 158). As described in greater detail below, the views of FIGS. 7A and 8A generally correspond to a first state; the views of FIGS. 7B and 8B generally correspond to a second state; the views of FIGS. 7C and 8C generally correspond to a third state; and the views of FIGS. 7D and 8D generally correspond to a fourth state.

Figure 7A:
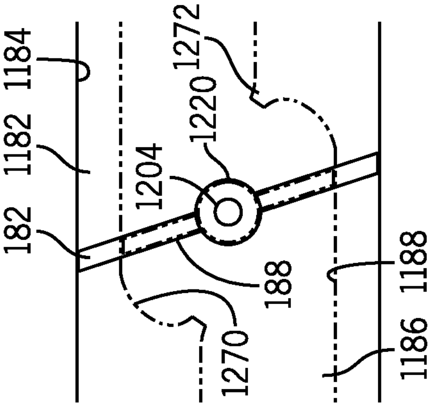
FIGS. 7A, 7B, 7C, and 7D are cross-sectional views of the EGR valves through line 7-7 and line 7'-7' of FIG. 5 in various states in accordance with an example embodiment.
Figure 8A:
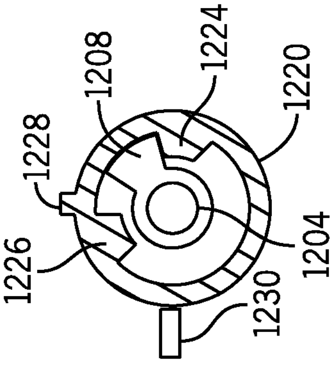
FIGS. 8A, 8B, 8C, and 8D are cross-sectional views of the EGR valves through line 8-8 of FIG. 5 in various states in accordance with an example embodiment.

Referring initially to FIGS. 7A and 8A, depicting the first state, the drive device 1202 and clutch device 1218 have initial or closed positions in which the valve element 182 closes the first passage 1182 and the valve element 188 closes the second passage 1186. Each of the initial positions of the valve elements 182, 188 of FIG. 7A may be considered to be an angle of 0°. In the first state, the actuator 1200 is not applying a torque to the drive device 1202 or the clutch device 1218 such that the return springs 1210, 1232 (FIG. 6) maintain the devices 1202, 1218 in the initial positions. In this initial position, as shown in FIG. 7A, the valve element 188 generally abuts the interior surface of the wall of the second passage 1186 to inhibit or prevent recirculated gas from passing across the valve element 188 through the second passage 1186, and the valve element 182 generally abuts the interior surface of the passage wall 1184 of the first passage 1182 to inhibit or prevent the recirculated exhaust gas from passing across the valve element 182 through the first passage 1182. As shown in FIG. 8A, the initial position of the drive shaft 1204 of the drive device 1202 is such that the drive cog 1208 abuts the first clutch cog 1224. Similarly, the clutch stop 1228 is spaced apart from the housing stop 1230.

Figure 7B:
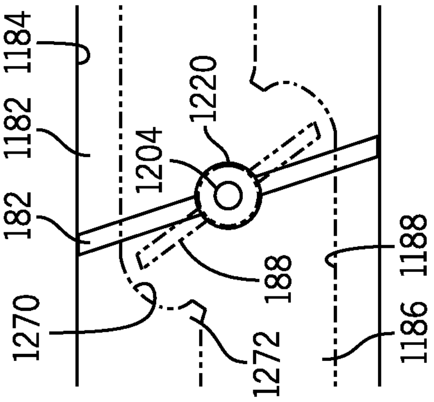
Figure 8B:
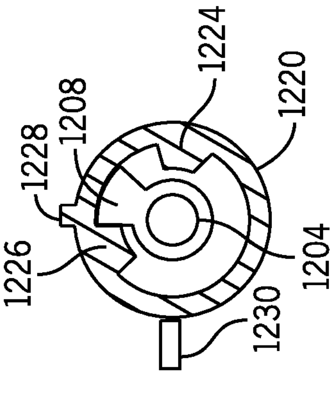

Now referring to FIGS. 7B and 8B, depicting the second state, the drive device 1202 is driven by the actuator 1200 in a first direction (e.g., clockwise) to partially open the second passage 1186 by pivoting the valve element 188 away from the second passage wall 1188. In this state, the first passage 1182 remains closed with the valve element 182 abutting the passage wall 1184. As an example, the valve element 188 is open to approximately 120°, while the valve element 182 remains closed. This operation is also depicted in FIG. 8B in which the actuator 1200 (FIG. 6) has pivoted the drive shaft 1204 and the associated drive cog 1208 in the first direction such that the drive cog 1208 is separated from the first clutch cog 1224 and approaches the second clutch cog 1226. The particular view of FIG. 8B depicts the drive cog 1208 just beginning to engage the second clutch cog 1226. When the drive cog 1208 is within an intermediate position, in between that depicted in FIGS. 8A and 8B, the drive cog 1208 does not drive or otherwise interact with the clutch cogs 1224, 1226 such that the drive device 1202 does not drive or otherwise interact with the clutch device 1218. As such, in these positions, the valve element 188 may be manipulated to open the second passage 1186 while maintaining the valve element 182 to close the first passage 1182. In other words, the circumferential distance between the first and second clutch cogs 1224, 1226 and the thickness of the drive cog 1208 defines the extent at which the valve element 188 opens while the valve element 182 remains closed. The intermediate positions of the valve element 188, represented by the positions in between the positions of FIG. 7A and FIG. 7B may be considered as part of the second state of the EGR distribution valve in which only the second passage 1186 is open.

Figure 7C:
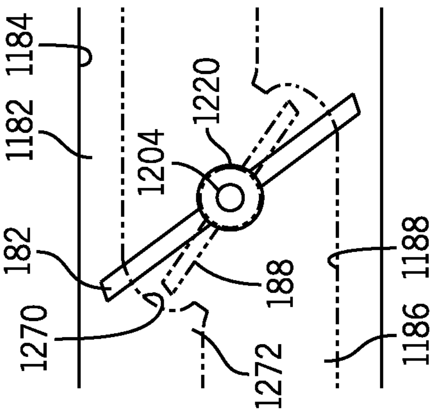
Figure 8C:
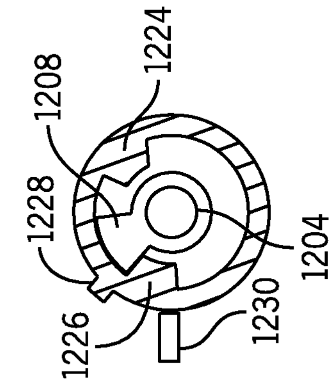

Now referring to views of FIGS. 7C and 8C, depicting the third state, as the actuator 1200 (FIG. 6) continues (relative to the second state) to pivot the drive device 1202 in the first direction, the drive cog 1208 on the drive shaft 1204 engages the second clutch cog 1226 on the clutch device 1218 to drive the clutch device 1218 in the first direction. As shown by the views of FIGS. 7C and 8C, as the clutch device 1218 is driven by the drive device 1202, the clutch device 1218 pivots in the direction with the drive device 1202 such that the valve element 188 and the valve element 182 are also pivoted in the first direction. As particularly shown in FIG. 7C, this operation functions to open the valve element 182 by pivoting the valve element 182 away from first passage wall 1188 such that recirculated exhaust gas may pass between the valve element 182 and the first passage wall 1188 and through the first passage 1182. In this state, the valve element 188 remains open. In one example, as the valve element 188 pivots from the position in FIG. 8B to the position in FIG. 8C, the second passage wall 1188 may have a curvature 1270 to provide a predetermined flow area between the valve element 188 and the second passage wall 1188 at the curvature 1270. In alternative examples, the curvature 1270 may be omitted, e.g., the second passage 1186 may have generally constant cross-sectional areas along the longitudinal direction proximate to the valve element 188. As examples in the third state, the valve element 188 is open approximately to about 10°-30° and the valve element 182 is open approximately to about 10°.

Figure 7D:
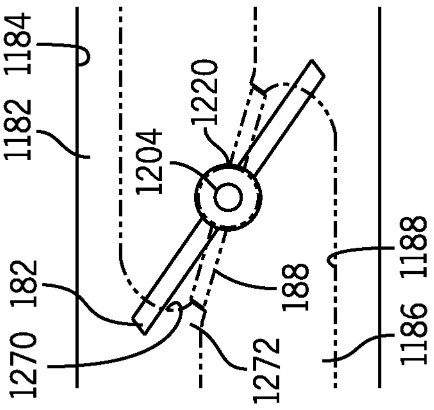
Figure 8D:
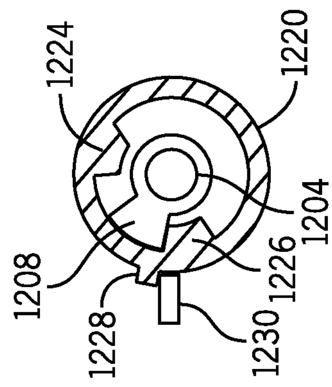

Now referring to the views of FIGS. 7D and 8D. depicting the fourth state, the valve element 188 pivots in the first direction until abutting a second passage wall closure flange 1272 positioned along the curvature 1270 on the second passage wall 1188. The second passage wall closure flange 1272 provides a closure counter-element for the valve element 188 such that the valve element 188 engages the second passage wall closure flange 1272 to close the second passage 1186 as the second passage 1186 moves in the first direction. In these positions, the valve element 188 closes the second passage 1186 and the valve element 182 opens the first passage 1182. Moreover, as the drive device 1202 drives the clutch device 1218 in the first direction, at a predetermined position, the clutch stop 1228 abuts the housing stop 1230 to provide a limit for the drive device 1202 and clutch device 1218 (and thus, the valve element 188 and the valve element 182) in the first direction.

In one example, when the actuator 1200 is deenergized from the second, third, or fourth states, the drive device 1202 and the clutch device 1218 return to the first state in which the valve element 188 and the valve element 182 pivot in the second direction to close the second passage 1186 and the first passage 1182. In particular, as the actuator 1200 is deenergized, the force on the drive device 1202 is removed, thereby also removing the force on the clutch device 1218. Upon removal of these forces, the return spring 1210 biases the drive device 1202 in the second direction to return to the initial position, and the return spring 1232 biases the clutch device 1218 in the second direction to the initial position. In some examples, the springs 1210, 1232 may be omitted and the actuator 1200 may be energized and/or operated to provide a force for the drive shaft 1204 in the second direction to pivot the valve element 188 in the second direction to close the second passage 1186, thereby driving the clutch body 1220 in the second direction to pivot the valve element 182 in the second direction to close the first passage 1182 to place the valve elements 182, 188 in the first state. In effect, the configuration of the valve elements 182, 188 enables operation of two valve elements 182, 188, and thus the control of gas flow through both EGR valves 152, 158 within a single actuator 1200.

Figure 2A:
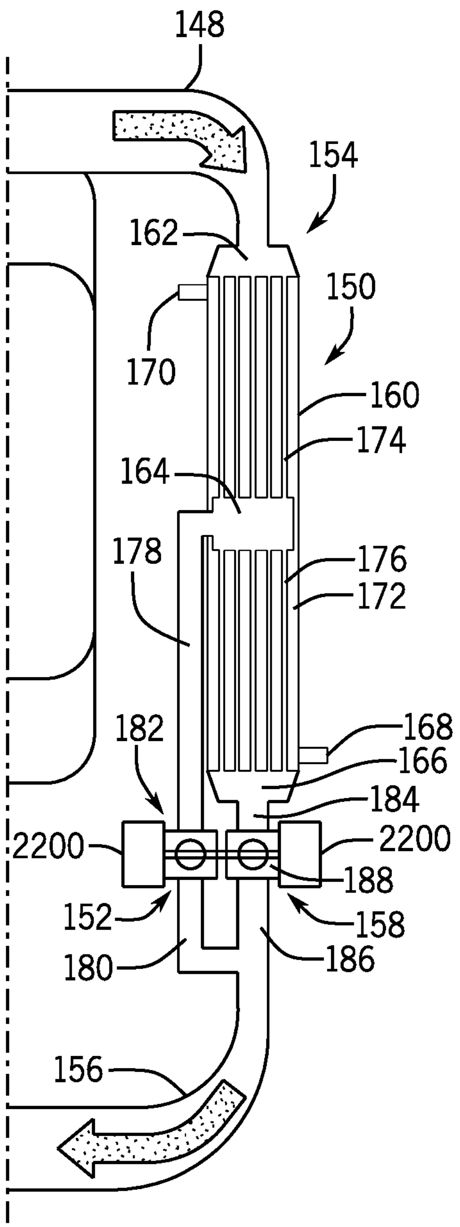
FIG. 2A is a simplified schematic diagram of a portion of the power system of FIG. 2 showing an alternative embodiment.
Figure 4A:
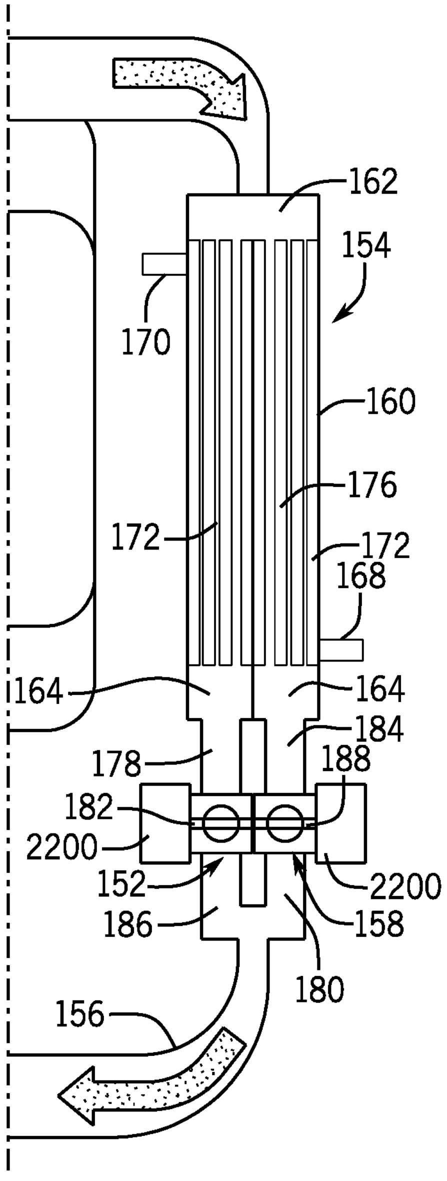
FIG. 4A is a simplified schematic diagram of a portion of the power system of FIG. 4 showing an alternative embodiment.

In embodiments as shown in FIGS. 2A, 3 and 4A, each valve element 182, 188 is controlled by an individual actuator 2200 which is mounted within or on a valve housing to position the respective valve element 182, 188 into the state. The actuator 1200 is configured to engage and drive a drive device and is controlled (e.g., energized, deenergized, commanded) by signals from the controller 110 (FIG. 2) to place the valve elements 182, 188 in the particular state. Like that described above, any suitable type of actuator 2200 may be provided, including pneumatic, hydraulic, or electronic with any suitable kind of linkage, gears, or other mechanism for transferring power to rotary motion in response to signals received from the controller (e.g., controller 110 of FIG. 1). In various examples, the actuator 2200 may be a direct drive DC motor with gear train, a brushless actuator with gear train and linkage, a DC motor with gear train and linkage, and direct drive brushless actuator with gear train, in which the gear trains may be in the form of two or three gears or a planetary gear system. As described above, the drive device used with each actuator 1200 may be considered to include a drive shaft arranged perpendicular to the flow directions through the passages in which the valve elements 182, 188 are positioned, with an end coupled to the respective actuator 1200 and further coupled to the respective valve element 182, 188 (and including the appropriate bearings and seals).

Figure 2B:
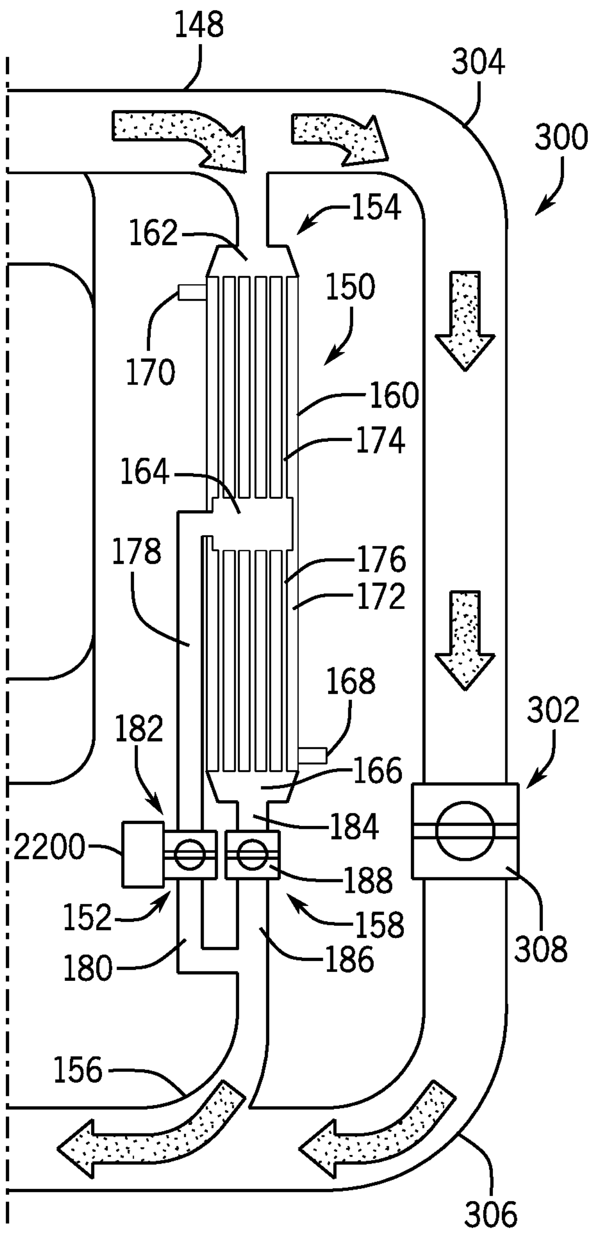
FIG. 2B is a simplified schematic diagram of a portion of the power system of FIG. 2 showing another alternative embodiment.
Figure 3A:
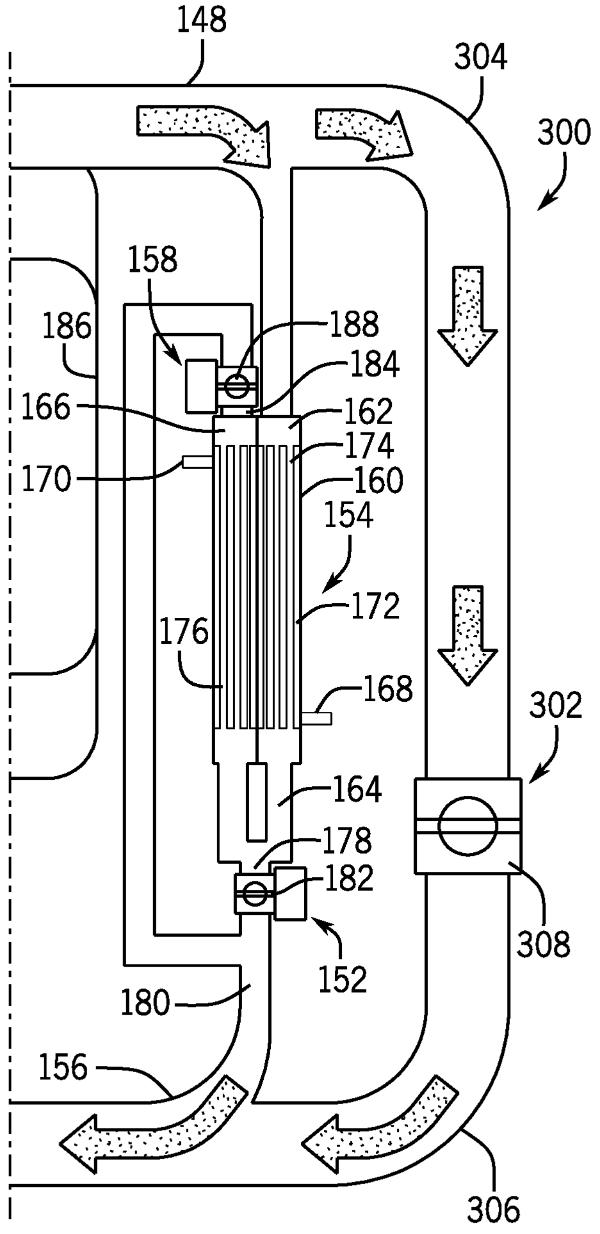
FIG. 3A is a simplified schematic diagram of a portion of the power system of FIG. 3 showing another alternative embodiment.
Figure 4B:
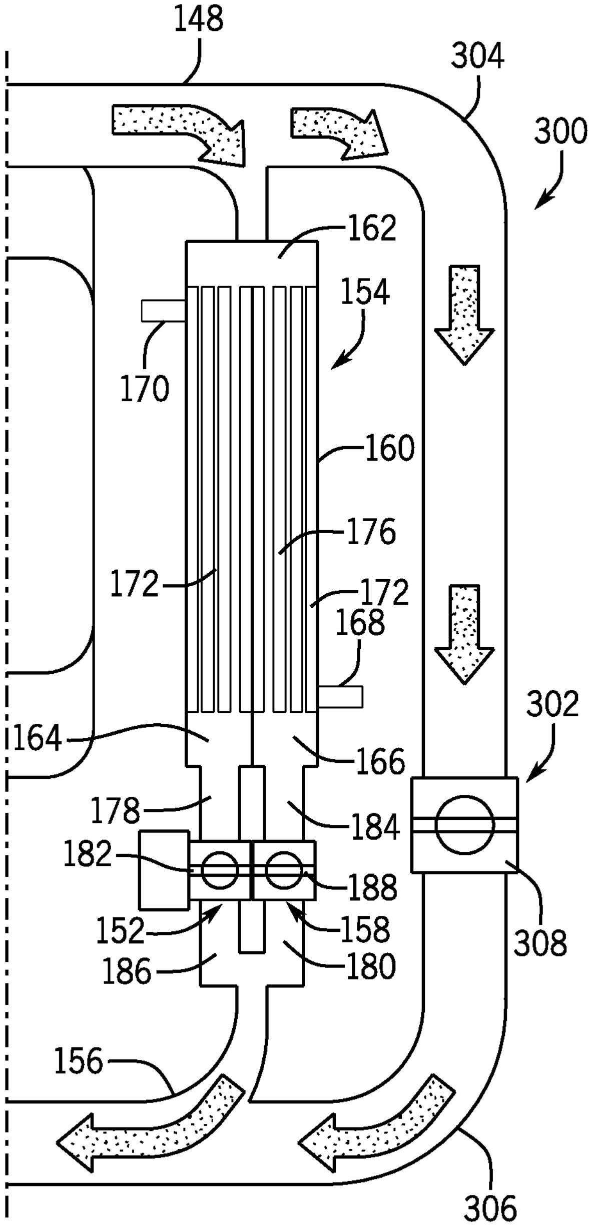
FIG. 4B is a simplified schematic diagram of a portion of the power system of FIG. 4 showing another alternative embodiment.

In embodiments as shown in FIGS. 2B, 3A and 4B, a bypass circuit 300 is additionally provided by a third EGR valve 302 which selectively couples the heated gas passageway or conduit 148 directly to the return conduit 156. The third EGR valve 302 may be formed of a first conduit 304 coupled to a second conduit 306 by a movable valve element 308. The first conduit 304 is in fluid communication with the heated gas passageway or conduit 148, and the second conduit is in fluid communication with the return conduit 156. With the third EGR valve 302 open, and the first and second EGR valves 152, 158 closed under control of the controller 110, the bypass circuit 300 bypasses the dual core EGR cooler 154 on initial startup and until the coolant reaches a desired temperature as is known in the art. The use of such a bypass circuit 300 enables operation of the EGR system 150 while the coolant is warming up, which provides a number of benefits, including improved white smoke clean up during start up; decreased NOx output when the components of the exhaust treatment system (e.g., the SCR) are still warming up; and decreased time for the engine and exhaust treatment system to warm up. After the coolant is sufficiently warm, the EGR system 150 is operated to initiate the flow of recirculated gas therethrough.

Accordingly, embodiments discussed herein provides a dual core exhaust gas recirculation cooler for vehicle power systems, including EGR valves. The embodiments discussed above provide such dual cores that are housed within the same cooler housing to provide for optimizing performance under light or heavy loads. The embodiments discussed above provide such dual cores that are housed within the same cooler housing thereby reducing parts and simplifying the routing of the gas through the exhaust recirculation system and providing a significant reduction in space, complexity, and cost relative to other designs. Additionally, the examples described above may enable the engine to control gas temperatures which will assists with emissions during SCR without damaging the engine. Also fine tuning the gas temperature may help with fuel consumption. Generally, the embodiments above provide of example configurations and arrangements of power system and/or engine configurations. However, the description above is generally applicable to any type of engine and/or vehicle systems.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the following examples are provided, which are numbered for easier reference.

1. A dual core exhaust gas recirculation (EGR) cooler comprising: a cooler housing having an EGR inlet, a first EGR outlet, a second EGR outlet, a coolant inlet and a coolant outlet; a cooling circuit extending from the coolant inlet through the cooler housing to the coolant outlet; a first EGR circuit core extending through the cooler housing from the EGR inlet to the first EGR outlet; a second EGR circuit core extending through the cooler housing to the second EGR outlet from the EGR inlet or the first EGR outlet; a first EGR valve configured to selectively couple the first EGR circuit core to a return passageway through the first EGR outlet; and a second EGR valve configured to selectively couple the second EGR circuit core to the return passageway through the second EGR outlet; and wherein the first and second EGR valves are configured to selectively flow exhaust gas through the cooler housing from the EGR inlet to the return passageway within either the first EGR circuit core only or within both the first EGR circuit core and the second EGR circuit core.
2. The cooler of example 1, wherein exhaust gas flows through the cooler housing to the return passageway within the first EGR circuit core and not the second EGR circuit core when the first EGR valve is open and the second EGR valve is closed; wherein exhaust gas flows through the cooler housing to the return passageway within the first EGR circuit core and the second EGR circuit core when the first EGR valve is closed and the second EGR valve is open; and wherein exhaust gas flows through the cooler housing to the return passageway within the first EGR circuit core and the second EGR circuit core when the first EGR valve is open and the second EGR valve is open.
3. The cooler of example 2, wherein the first and second EGR circuit cores are in series.
4. The cooler of example 3, wherein the exhaust gas flows in series through the first EGR circuit core and the second EGR circuit core when the first EGR valve is closed and the second EGR valve is open.
5. The cooler of example 3, wherein the first and second EGR valves are driven by a common actuator.
6. The cooler of example 2, wherein the first and second EGR circuit cores are in parallel.
7. The cooler of example 6, wherein the exhaust gas flows in series through the first EGR circuit core and the second EGR circuit core when the first EGR valve is closed and the second EGR valve is open.
8. The cooler of example 6, wherein each EGR valve is driven by an actuator.
9. The cooler of example 2, wherein each of the first and second EGR circuit cores is formed by a plurality of tubes.
10. The cooler of example 1, wherein exhaust gas flows through the cooler housing to the return passageway within the first EGR circuit core and not the second EGR circuit core when the first EGR valve is open and the second EGR valve is closed; and wherein exhaust gas flows through the cooler housing to the return passageway within the second EGR circuit core and not the first EGR circuit core when the first EGR valve is closed and the second EGR valve is open; and wherein exhaust gas flows through the cooler housing to the return passageway within the first EGR circuit core and the second EGR circuit core when the first EGR valve is open and the second EGR valve is open.
11. The cooler of example 10, wherein the first and second EGR circuit cores are in parallel.
12. The cooler of example 11, wherein the exhaust gas flows in parallel when the first EGR valve is open and the second EGR valve is open.
13. The cooler of example 11, wherein the first and second EGR valves are driven by a common actuator.
14. The cooler of example 10, wherein each of the first and second EGR circuit cores is formed by a plurality of tubes.

15. The cooler of example 1, further comprising a heated gas passageway coupled to the EGR inlet; and a bypass circuit having a third EGR valve configured to selectively couple the heated gas passageway to the return passageway The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A dual core exhaust gas recirculation (EGR) cooler comprising:

a cooler housing having a first end, a second end opposite the first end, and sides spanning the first and second ends, the cooler housing having an EGR inlet at the first end of the cooler housing, a first EGR outlet intermediate the first end and the second end of the cooler housing, a second EGR outlet at the second end of the cooler housing, a coolant inlet and a coolant outlet;

a cooling circuit extending from the coolant inlet through the cooler housing to the coolant outlet;

a first EGR circuit core extending through the cooler housing from the EGR inlet to the first EGR outlet, the first EGR circuit core having a first plurality of tubes extending in a direction from the first end to the second end of the cooler housing;

a second EGR circuit core extending through the cooler housing to the second EGR outlet from the EGR inlet or the first EGR outlet, the second EGR circuit core having a second plurality of tubes extending in the direction from the first end to the second end of the cooler housing;

a first EGR valve configured to selectively couple the first EGR circuit core to a return passageway through the first EGR outlet;

a second EGR valve configured to selectively couple the second EGR circuit core to the return passageway through the second EGR outlet; and a controller having processing architecture for executing instructions to control the first and second EGR valves;

wherein the controller is configured to control the first and second EGR valves selectively flow EGR exhaust gas through the cooler housing from the EGR inlet to the return passageway within either the first EGR circuit core only or within both the first EGR circuit core and the second EGR circuit core;

wherein when the controller controls the first EGR valve to open and the second EGR valve to close all the EGR exhaust gas flows through the cooler housing to the return passageway within the first EGR circuit core and not the second EGR circuit core;

wherein when the controller controls the first EGR valve to close and the second EGR valve to open all the EGR exhaust gas flows through the cooler housing to the return passageway within the first EGR circuit core and the second EGR circuit core; and wherein when the controller controls the first EGR valve to open and the second EGR valve to open:

a first portion of the EGR exhaust gas flows through the cooler housing to the return passageway within the first EGR circuit core only; and a second portion of the EGR exhaust gas flows through the cooler housing to the return passageway within the first EGR circuit core and the second EGR circuit core;

wherein the first portion of the EGR exhaust gas, at a first temperature, mixes with the second portion of the EGR exhaust gas, at a second temperature, within the return passageway.

2. The cooler of claim 1, wherein the first and second EGR circuit cores are in series.

3. The cooler of claim 2, wherein all the EGR exhaust gas flows in series through the first EGR circuit core and the second EGR circuit core when the first EGR valve is closed and the second EGR valve is open.

4. The cooler of claim 2, wherein the first and second EGR valves are driven by a common actuator.

5. The cooler of claim 1, further comprising a heated gas passageway coupled to the EGR inlet; and a bypass circuit having a third EGR valve configured to selectively couple the heated gas passageway to the return passageway.

6. The cooler of claim 5, wherein the third EGR valve is driven by an actuator.

7. The cooler of claim 5, wherein the first, second and third EGR valves can be moved to one of a closed state, an open state, and a partially open state.

8. The cooler of claim 1, wherein the first and second EGR valves can be moved to one of a closed state, an open state, and a partially open state.

* * * * *